Inventor:
George H. Nobbs.

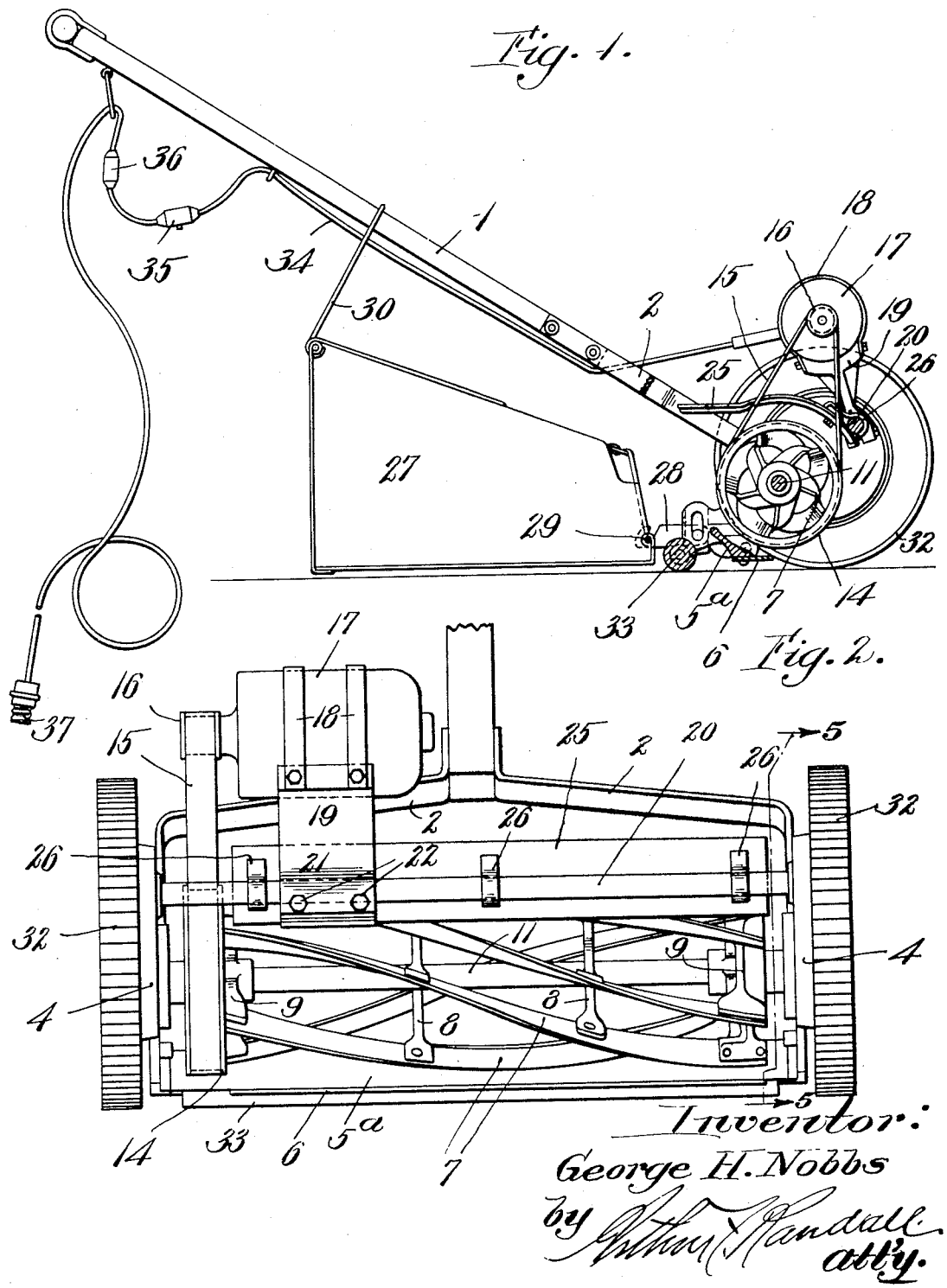

Patented Jan. 10, 1933

1,894,053

UNITED STATES PATENT OFFICE

GEORGE H. NOBBS, OF WATERTOWN, MASSACHUSETTS

LAWN MOWER

Application filed January 26, 1927. Serial No. 163,779.

My invention relates to lawn mowers and it has for its object to provide an improved machine of this kind. A further object of my invention is to provide an efficient lawn mower whose bladed reel is power driven by an electric motor independently of its supporting wheels, and also to make it possible to readily convert a manually operated lawn mower of standard make into a lawn mower of this character at little expense. It is a further object of my invention to provide a lawn mower particularly a lawn mower of the power driven type with efficient means for collecting within a hopper the grass that is cut.

To these ends my invention consists of an improved lawn mower having the peculiar features of construction and arrangement of parts set forth in the following description, and also in the hereinafter described method and means which I have devised whereby a manually operated lawn mower of standard make, can, at small expense and with comparatively little labor, be converted into a power operated lawn mower, the several novel features of my invention being particularly pointed out and defined in the claims at the close of the description.

In the accompanying drawings:

Figure 1 is a side elevation partly in section of a lawn mower constructed in accordance with my invention.

Figure 2 is a front view of a portion of the machine shown in Fig. 1.

Figure 3:
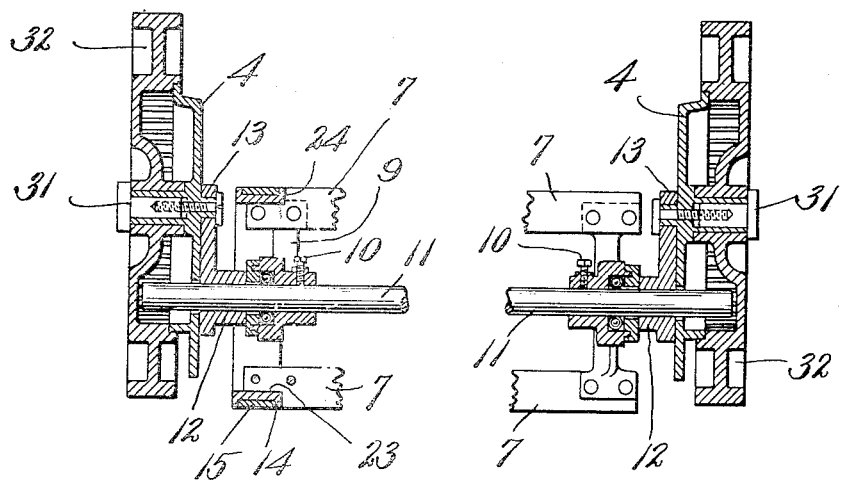
Figure 3 is a sectional view, broken away at its middle on line 3—3 of Fig. 5.
Figure 4:
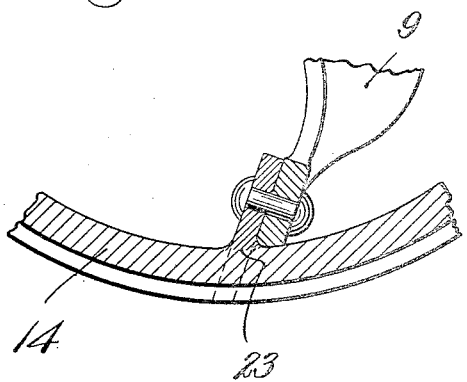
Figure 4 is sectional detail, on larger scale, that is hereinafter described.
Figure 5:
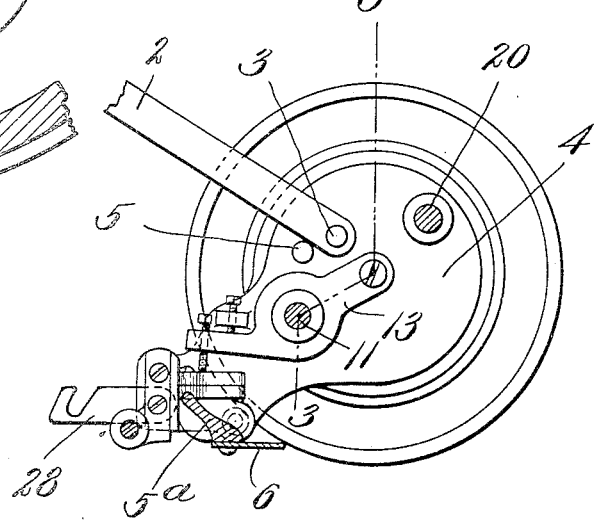
Figure 5 is a partial section on line 5—5 of Fig. 2.

Having reference to the drawings 1 is the handle of my improved lawn mower provided at its lower end with laterally extending arms 2, 2 providing at that end a yoke whose ends are formed with apertures occupied by studs 3 projecting from the side plates 4, 4. In this fashion the handle is pivotally connected with the two side plates 4, 4, a stop lug 5 being provided on each side plate to limit the swing of the handle toward the ground.

The two side plates 4, 4 are, as usual, connected near their lower ends by a cross-bar 5a to which the usual bed knife 6 is secured in the ordinary fashion, as by rivets or screws or the like. This bed knife 6 co-operates with the spiral blades 7 forming part of the cutting reel which also includes two intermediate spiders 8 and two end spiders 9 carrying and connected with the blades.

The machine herein shown is one that is produced by re-modeling and altering a well known standard lawn mower, and the particular construction herein employed in carrying out my invention, is one to which I have resorted to convert such an old style lawn mower into one embodying my invention. This particular construction, while not essential to my invention in its broadest aspect, I consider to have features of value of its own which make it desirable to include as features of this invention. The invention also contemplates producing an original design embodying my invention.

The two end spiders 9, 9 are, as usual, provided with hubs fastened by screws 10 to a shaft 11 journaled at its ends in bearings 12 provided on swing arms 13 adjustably mounted, as usual, upon the side plates 4, 4. The two intermediate spiders 8 are not provided with hubs but with central apertures through which the shaft 11 loosely extends, as usual.

The reel comprising the spiral blades 7, blade-carrying spiders or end members 9, 9 and shaft 11 is provided with a pulley 14 connected by a belt 15, with a pulley 16 fast on the armature shaft of an electric motor 17. The motor 17 is fastened by straps 18 to a cantilever bracket arm 19 rigidly secured to a fixed cross-bar or tie-rod 20 forming part of the frame of the machine, but with provision for angular adjustment therein whereby the belt 15 may be kept taut. To provide for thus securing the bracket arm 19 to the cross-bar 20. said arm is provided with a split hub 21 clamped on the cross-bar by means of screws 22. Any other suitable or desired construction may, however, be resorted to for mounting the motor 17 upon the frame of the machine with provision for adjustment as described. The cross-bar 20 is rigidly secured at its ends to the side plates 4, 4 in the usual fashion, and the side plates together with the cross-bars 5a and 20 constitute the main parts of the frame, said parts being, as usual, rigidly fastened together.

In re-modeling a standard lawn mower of the type referred to, I cut away the end portions of the blades 7 of the reel at one side of the machine to provide reduced portions 23 at the ends of said blades adapted to fit within an exteriorly grooved ring constituting the pulley 14, said ring seating also against shoulders 24 on the blades. After placing the pulley ring 24 in this position it is preferably secured to the blades by welding but any other suitable means for fastening the pulley ring to the reel may be resorted to. The construction just referred to, however, is very simple, effective and inexpensive and particularly appropriate to most forms of standard lawn mowers now on the market.

It is the practice to make the bed knife 6 of the same length as the reel blades 7 and, therefore, when the pulley ring 14 is attached to the reel as described, it is necessary to reduce the length of the bed knife 6 by removing or cutting away the bed knife at one end so that there will be no interference between it and the pulley ring 14. It is customary to bolt or rivet the bed knife 6 to the cross-bar 5a.

An important feature of this invention is the provision of a deflector 25 adjustably fixed in position upon the bar 20 and extending rearwardly over the reel, said deflector being fixed in position upon the cross-bar 20 with provision for angular adjustment toward and from the reel by means of several clamps 26. Because of the adjustability of this deflector it is possible to raise or lower it relatively to the cutting reel so that the different kinds of grass cut may be most efficiently directed rearwardly and discharged into a receptacle 27. It is well known that different kinds of grass will be discharged rearwardly from the whirling reel at different angles with relation to the ground. Sometimes grass of one kind, or grass in one condition. That is, for example, grass that gether different, when thrown rearwardly than grass of another kind, or in a different condition. That is, for example, grass that is wet with dew or the like would act altogether different, when thrown rearwardly by the whirling reel, than dry grass. It will be appreciated that this provision of a deflector 25 that is adjustable so that it can be set in position to meet varying conditions under which the machine is operated, is a valuable and important feature.

It is customary to provide, at the rear of the reel, a receptacle 27 to receive the grass that is cut and thrown rearwardly by the reel. At its forward end this receptacle is supported by brackets 28 at opposite sides of the machine engaging the end portions of a cross-bar 29 forming part of the receptacle 27. The rear end of the receptacle 27 is supported by a hanger 30 connected at its upper end with handle 1. This receptacle 27 not only receives the cut grass from the reel but it also serves as a guard to protect the operator from stones or the like that are struck by the reel and thrown rearwardly with the grass. The deflector 25 likewise serves as a guard to protect the operator.

The end plates 4, 4 are, as usual, provided with trunnions 31 for the wheels 32 which support the forward portion of the frame. The rear portion of the frame is supported by the usual roller 33 journaled at its ends in bearings provided on adjustable brackets secured to the frame of the machine. These brackets are as usual, adjustable vertically on the frame to regulate the height of cut.

The motor 17 is in a circuit including a two-wire cable 34, a push-button switch 35, a coupling, or connector, 36 and screw plug 37. The cable 34 is made of considerable length and as will be clear, the plug 37 is adapted to be screwed into a socket of the lighting circuit of a house, from which the power to drive the motor 17 may be supplied.

As heretofore constructed, the old style hand operated lawn mower which I have herein modified to produce my improved machine, had its shaft 11 provided at each end thereof with a pinion inclosed between the adjacent side plate 4 and its wheel 32, said pinion meshing with internal gear teeth provided upon the wheel. In remodeling the machine these two pinions are preferably removed and dispensed with so that said machine is manually propelled over the ground. It is not, however, essential that these pinions be removed and if left in position on the shaft 11 the wheels 4 will be propelled over the ground by motor 17.

The above described motor operated lawn mower is of simple, inexpensive and efficient construction and, as with the form of my invention herein shown, may be produced at very low cost by the addition, to a machine of standard make, of a few attachment parts and, in the preferred form of my invention, the removal of the two pinions referred to.

What I claim is:

1. In a manually propelled lawn mower, the combination with the frame including as a rigid part thereof a round transverse tie-rod; a knife reel rotatably mounted on said frame; a driven wheel connected with said knife reel; supporting wheels for said frame, one opposite each end of said tie-rod and each freely rotatable independently of said knife reel, of a cantilever bracket arm attachment having means by which it is fixedly clamped upon said tie-rod; an electric motor mounted upon and supported by said cantilever bracket arm attachment with its armature shaft parallel with the axis of said reel and so that said motor is bodily adjustable toward and from the latter, a driving wheel on said armature shaft and an endless flexible power-transmitting member connecting said driving and driven wheels.

2. A lawn mower comprising a reel having a plurality of knife blades; a frame on which said reel is rotatably mounted; a bed knife co-operating with said reel; wheels mounted on and supporting said frame from the ground; a handle connected with said frame by means of which the machine is manipulated; a pulley directly connected with the blades of the reel; a bracket; means to clamp said bracket to a crossbar forming part of the frame with provision for swinging adjustment of said bracket on said crossbar toward and from the axis of said reel; an electric motor mounted on said bracket and adjustable therewith toward and from the axis of the reel; a pulley on the armature shaft of said motor; a belt connecting said two pulleys; a circuit for said motor including a cable connected at one end with said motor and means at the opposite end of said cable for coupling that end to a power-supplying circuit.

3. A lawn mower constructed in accordance with claim 2 and including also a receptacle supported by said frame at the rear of said reel; a deflector for directing the cut grass into said receptacle, and means fastening the forward portion of said deflector rigidly to said crossbar with provision for up and down swinging adjustment of the rear portion of the deflector, said deflector occupying a position between the reel and motor so as to shield the armature shaft, its pulley, the belt and the motor and extending rearwardly beyond the reel so as to direct the cut material rearwardly into said receptacle.

4. In a lawn mower, the combination with the frame including as a rigid part thereof a round transverse tie-rod; a knife reel rotatably mounted on said frame; a driven wheel connected with said knife reel, and supporting wheels for said frame, of a cantilever bracket arm having means adjacent one end thereof by which it is fixedly clamped upon said tie-rod, said means being operable to permit of angular adjustment of said cantilever bracket arm on an axis that is parallel with the axis of said reel; an electric motor supported by said cantilever bracket arm with its armature shaft parallel with the axis of said reel and bodily movable toward and from the latter when said cantilever bracket arm is adjusted on said tie-rod; a driving wheel on said armature shaft, and an endless flexible power-transmitting member connecting said driving and driven wheels.

5. In a lawn mower, the combination with the frame thereof including a fixed transverse horizontal rod extending from side to side thereof; a knife reel rotatably mounted on said frame below said transverse rod and provided adjacent one end thereof with a driven wheel and a pair of frame supporting ground wheels, one opposite each end of said transverse rod, of an electric motor; a driving wheel fixed on the armature shaft of said motor; an endless flexible power-transmitting member connecting said driving and driven wheels and a bracket arm mounted upon said transverse rod between said frame-supporting ground wheels on which said motor is supported with the axis of its armature shaft parallel with the axis of said reel.

Signed by me at Boston, county of Suffolk and State of Massachusetts, this 17th day of January, 1927.

GEORGE H. NOBBS.